United States Patent
Zhao et al.

(10) Patent No.: US 8,953,476 B2
(45) Date of Patent: Feb. 10, 2015

(54) METHOD AND APPARATUSES FOR DATA TRANSFER WITHIN A RELAY ENHANCED TELECOMMUNICATION NETWORK

(75) Inventors: Zhu Yan Zhao, Beijing (CN); Simone Redana, Munich (DE); Bernhard Raaf, Neuried (DE)

(73) Assignee: Nokia Siemens Networks Oy, Espoo (FI)

( * ) Notice: Subject to any disclaimer, the term of this patent is extended or adjusted under 35 U.S.C. 154(b) by 285 days.

(21) Appl. No.: 13/505,586

(22) PCT Filed: Nov. 3, 2009

(86) PCT No.: PCT/EP2009/064532
§ 371 (c)(1),
(2), (4) Date: Jun. 11, 2012

(87) PCT Pub. No.: WO2011/054372
PCT Pub. Date: May 12, 2011

(65) Prior Publication Data
US 2012/0250526 A1    Oct. 4, 2012

(51) Int. Cl.
| | |
|---|---|
| *H04L 12/26* | (2006.01) |
| *H04B 7/14* | (2006.01) |
| *H04J 1/10* | (2006.01) |
| *H04J 3/08* | (2006.01) |
| *H04W 72/08* | (2009.01) |
| *H04B 7/26* | (2006.01) |
| *H04B 7/155* | (2006.01) |
| *H04W 72/12* | (2009.01) |
| *H04W 84/04* | (2009.01) |

(52) U.S. Cl.
CPC ......... *H04W 72/082* (2013.01); *H04B 7/15564* (2013.01); *H04W 72/1231* (2013.01); *H04B 7/15557* (2013.01); *H04W 84/047* (2013.01); *H04B 7/2606* (2013.01)

USPC .......................................... 370/252; 370/315

(58) Field of Classification Search
None
See application file for complete search history.

(56) References Cited

U.S. PATENT DOCUMENTS

| | | | |
|---|---|---|---|
| 2007/0147341 | A1 | 6/2007 | Izumikawa et al. |
| 2007/0211822 | A1* | 9/2007 | Olesen et al. .................. 375/299 |
| 2008/0240054 | A1 | 10/2008 | Sandhu et al. |
| 2009/0190485 | A1* | 7/2009 | Bjorkegren et al. .......... 370/252 |
| 2009/0221231 | A1* | 9/2009 | Weng et al. ..................... 455/15 |

(Continued)

OTHER PUBLICATIONS

Saleh, A.B., et al., "Performance of Amplify-and-Forward and Decode-and-Forward Relays in LTE-Advanced", © 2009 IEEE, 5 pgs.

(Continued)

*Primary Examiner* — Ashley Shivers
(74) *Attorney, Agent, or Firm* — Harrington & Smith

(57) ABSTRACT

A method for scheduling a first user equipment, UE, with a first performance causing a first self interference of a relay system between a first access link extending between the relay system and the first UE and a relay link extending between the relay system and a base station, BS, and scheduling a second UE with a second performance causing a second self interference of the relay system between a second access link extending between the relay system and the second UE and the relay link extending between the relay system and the BS. Thereby, if the first self interference is larger than the second self interference, the first performance is smaller than the second performance. Alternatively, if the first self interference is smaller than the second self interference, the first performance is larger than the second performance.

19 Claims, 5 Drawing Sheets

(56) References Cited

U.S. PATENT DOCUMENTS

2010/0120446 A1* 5/2010 Gaal .......................... 455/452.2
2012/0134275 A1* 5/2012 Choi et al. ................... 370/241

OTHER PUBLICATIONS

R1-090732, 3GPP TSG RAN WG1 Meeting #56, Athens, Greece, Feb. 9-13, 2009, "Cell Edge Performance for Amplify and Forward vs. Decode and Forward Relays", Nokia Siemens Networks, Nokia, 5 pgs.

3GPP TR 36.912 V2.0.0 (Aug. 2009), "$3^{rd}$ Generation Partnership Project; Technical Specification Group Radio Access Network; Feasibility Study for Further Advancements for E-UTRA (LTE-Advanced) (Release 9)", 52 pgs.

* cited by examiner

METHOD AND APPARATUSES FOR DATA TRANSFER WITHIN A RELAY ENHANCED TELECOMMUNICATION NETWORK

FIELD OF INVENTION

The present invention relates to the field of relay enhanced telecommunication network. Specifically, the present invention relates to a method for transferring data within a radio telecommunication network comprising a base station, a relay system, a first user equipment and a second user equipment. Further, the present invention relates to a relay system and to a base station which are adapted for controlling the mentioned data transfer method.

ART BACKGROUND

A cost efficient solution for improving the performance of Long Term Evolution (LTE) and LTE-Advanced (LTE-A) telecommunication networks can be the utilization of relay nodes (RN), which allows installations without having terrestrial broad-band access or the need to install a micro wave link. In a relay enhance network there are basically three different types of connections: (A) A first type is the connection between a base station (BS), which in Long Term Evolution (LTE) technology is called an enhanced NodeB (eNB), and a RN. The RN serving BS is also called a donor BS. The respective cell is called a donor cell. (B) A second type is the connection between a BS a User Equipment (UE). (C) A third type is the connection between a RN and a UE.

The connection between a BS and a RN can be inband, in which case the BS-to-RN link shares the same frequency band with the RN-to-UE links within the donor cell. Alternatively, the connection can be outband, in which case the BS-to-RN link does not operate in the same frequency band as direct BS-to-UE links within the donor cell of the RN.

For inband relaying, the BS-to-RN link operates in the same frequency spectrum as the RN-to-UE link. Thereby, a transmitter of a RN may cause interference to its own receiver. Therefore, simultaneous BS-to-RN and RN-to-UE transmissions (full duplex transmission) on the same frequency band may not be feasible. This holds in particular in the case that traditional antenna and signal processing technology are used.

For outband relaying a similar problem as for inband relaying occurs in the case the BS-to-RN link and RN-to-UE link use adjacent frequency channels. The self interference between the RN-to-BS link and the RN-to-UE link still prevents the RN to perform full duplex transmission when the self isolation between the RN transmitter and the RN transceiver for adjacent channels is not large enough.

To avoid RN self interference due to a limited or a poor self isolation, a half duplex transmission solution is defined in 3GPP for LTE RNs. The RN does not transmit to UEs when it is supposed to receive data from its donor BS. This means that "time-gaps" are created in the RN-to-UE transmission. Compared to the full duplex transmission scheme, the transmission time of the half duplex transmission scheme is shorter for both the BS-to-RN link, which in the following is also called a relay link, and the RN-to-UE link, which in the following is also called access link. Therefore, the overall transmission efficiency is reduced and the transmission delay is increasing.

In order to realize a good self isolation of a RN different measures are known. (A) One effective measure is to use spatial multiplexing between the RN's relay antenna and the RN's access antenna. This means that different signal transmission directions between the RN-to-BS link and the UE-to-RN link are used. (B) A further known measure is to establish a big spatial distance between the transmitting antenna and the receiving antenna of a RN. In uplink (UL) radio transmissions the receiving antenna is used for receiving radio signals from at least one UE and the transmitting antenna is used for transmitting radio signals to the donor BS. Accordingly, in downlink (DL) radio transmissions the receiving antenna is used for receiving radio signals from the donor BS and the transmitting antenna is used for transmitting radio signals to at least one UE being connected by the RN. In case a sufficient radio self isolation is established and the RN supports full duplex transmission in hardware and software, the RN can be operated with full duplex transmission.

However, real radio telecommunication network environments are typically very complex and in some RN deployment scenarios it is hard to implement a good self isolation between the relay link and the access link for instance due to a strong signal reflection. The signal reflection may break the signal isolation generated for instance by the directional character of the antenna(s) of a RN. In this respect a directional character of a RN antenna is given if the signal transmission and reception pattern is limited to wanted spatial direction and the signal strength of Tx/Rx in unwanted direction will be attenuated.

It can be easily understood that an unwanted signal reflection will change the signal's transmission direction and a part of the unwanted signal will arrive to the RN receive antenna through the reflection. If the reflection signal's strength is big enough, the respective interference signal can even block the RN receiver. In this case even an advanced digital signal processing in order to suppress the interference cannot work.

For a RN, the strength of self interference being generated by Tx signal reflection to Rx side depends on (a) the location and the directional property of a radio reflector, (b) the directions of the RN transmit antenna and the RN receive antenna, and (c) the strength of the transmitted radio signal.

Moreover, the self interference strength of a RN may also depend on which UE the RN is serving. This may be the case when a directional antenna or beam forming is used for the RN-to-UE link and a radio reflector is present. Then, the radio signal reflection will depend on both the reflector's location and the UE's location which is pointed by the directional antenna radiation pattern. Therefore, the RN may serve (a) some UEs which are located in places that cause no or only little reflection and (b) other UEs that cause strong reflection. In case that the RN transmits to the UEs in the direction with no or only little reflection (case (a)), then good isolation between the RN-to-BS link and the RN-to-UE link is guaranteed and the RN may be operated with full duplex transmission. On the contrary, when the RN transmits to the UE in the direction with strong reflection (case (b)), then strong RN self interference might occur and the RN cannot be operated with full duplex transmission.

The above described situation will become even more complex if the reflector is mobile such as a bus passing through the coverage area of the RN. Therefore, the above described discrimination between UE's allowing for full duplex transmission and other UE's allowing only for half duplex transmission will even become time dependent.

In addition to RN self interference, a RN operating in full duplex transmission may also cause interference between the BS when transmitting to the RN and the RN transmitting to the UEs in DL direction. In case a RN operates in half duplex transmission mode, the BS may transmit to a UE which is connected to the BS while the RN transmits to a UE served by it. To avoid the interference of a transmitting BS to the UEs served by a RN, the BS may stop transmission in the RN direction or at least reduce the transmission power in RN direction. In a RN full duplex transmission mode, the BS transmits to the RN during the time that the RN transmits to the UE. This UE may suffer from interference originating from the TX signal of the BS. Thereby, the strength of this interference typically strongly depends on the current location of the UE.

Furthermore, in case of a RN operating in full duplex transmission mode there might occur interference between the RN-to-BS link (also called backhaul link) and the UE-to-RN link (access link) when the RN transmits in uplink on the backhaul link using the same radio resources which are also used for the uplink transmission by its connected UEs. This type of interference can also be called access-to-backhaul interference.

In summary, in order to enable a RN for performing full duplex transmission, which of cause improves the performance of the respective relay enhanced telecommunication network, at least the four following conditions should have been satisfied:

1. Of course the RN must have the capability for a full duplex transmission. Apart from having at least two sets of transceivers this might require in particular a good antenna for isolation and advanced interference cancellation algorithm.

2. The self interference strength between the RN-to-BS link (relay link) and the RN-to-UE link (access link) has to be below a predetermined RN work point. This work point may depend on various parameters such as for instance (a) the link rate, (b) the modulation and coding schemes used for TX and RX, (c) a factor of self interference suppression caused by advanced signal processing methods, (d) the self interference determined by the RN's position and/or (e) the position of a radio reflector and the position of the served UEs.

3. At least some UEs being served by or connected with the RN must not suffer from interference caused by the donor BS. If all the UEs suffer the interference from the donor BS, it is meaningless to enable the RN performing simultaneously TX and RX.

4. The UEs connected to RN do not produce too much interference to the RN-to-BS (i.e. uplink backhaul) transmission.

There may be a need for improving the performance of a relay enhanced radio telecommunication network.

SUMMARY OF THE INVENTION

This need may be met by the subject matter according to the independent claims. Advantageous embodiments of the present invention are described by the dependent claims.

According to a first aspect of the invention there is provided a method for transferring data within a radio telecommunication network comprising a base station, a relay system, a first user equipment and a second user equipment. The provided method comprises (a) scheduling the first user equipment with a first performance causing a first self interference of the relay system between a first access link extending between the relay system and the first user equipment and a relay link extending between the relay system and the base station, and (b) scheduling the second user equipment with a second performance causing a second self interference of the relay system between a second access link extending between the relay system and the second user equipment and the relay link extending between the relay system and the base station. Thereby, if the first self interference is larger than the second self interference the first performance is smaller than the second performance. Alternatively, if the first self interference is smaller than the second self interference the first performance is larger than the second performance.

The described data transferring method is based on the idea that different relay system self interferences, which are associated with scheduling different user equipments (UEs), can be used for differentiating between the performance, which is assigned to the different UEs. Specifically, if a scheduling of a UE causes only a comparatively small or no self interference, this UE can scheduled with a large performance without affecting the operational reliability of the RN. By contrast thereto, if a scheduling of a UE causes a comparatively large self interference, this UE can only be scheduled with a comparatively small performance in order not to affect the operational reliability of the relay system.

In this context self interference may mean that when the relay system simultaneously (a) transmits a downlink (DL) radio signal to a connected UE and (b) receives a DL radio signal from its donor BS, at least a portion of the transmitted radio signal may be received by the relay system causing an unwanted feedback contribution to the total received DL radio signal. As a consequence the quality of the radio signal from the donor BS may be deteriorated. Correspondingly, a relay system self interference may occur if the relay system simultaneously (a) transmits an uplink (UL) radio signal to its donor BS and (b) receives an UL radio signal from a connected UE such that at least a portion of the transmitted radio signal is received by the relay system causing an unwanted feedback contribution to the total received UL radio signal. As a consequence, the quality of the radio signal from the UE may be deteriorated.

At this point it is mentioned that the term "self isolation" is directly related to the above elucidated term "self interference". Specifically, self isolation is a measure for the strength of the radiative coupling between the transmitting unit of a relay system and the receiving unit of the relay system. A large relay system self isolation will cause a comparatively small relay system self interference and a small relay system self isolation will cause a comparatively large relay system self interference.

In this document the term "performance" may be used for a measure for the amount of data which can be transferred between the relay system and the respective UE within a certain period of time. Specifically, a comparatively large performance may allow for a large data throughput between the relay system and the respective UE. A smaller performance may allow only for a smaller data throughput.

A large performance may be achieved for instance by assigning a sensitive modulation and coding scheme (MCS) for the radio link between the relay system and the respective UE, that allows to carry a comparatively large amount of data. Further, in addition and/or in combination a large performance for the UE may be achieved by allowing the relay system to operate with a full duplex transmission mode when scheduling the respective UE.

In this respect it is mentioned that a relay system allows for bidirectional radio connections both upwards to its donor BS and downwards to its served UE(s). Therefore, a relay system, which is equipped with the appropriate Hardware and the appropriate Software, may simultaneously (a) transmit data signals both to its donor BS and to its connected UE(s) and (b) receive data signals both from its donor BS and from its connected UE(s). Therefore, a relay system transmission mode, wherein these four radio links are active, may also be called a quadruplexing transmission mode.

There might be different reasons why scheduling different UEs causes different relay system self interferences. For instance if the relay system comprises at least two transmit antennas which allow for performing a beamforming (the spatial radiation pattern of the relay system is not uniform but can be adapted to preferred radiation directions) a transmit direction being assigned to one UE might cause strong relay system self interference whereas another transmit direction being assigned to another UE might cause only a small relay system self interference.

The described radio telecommunication network may be for instance a Long Term Evolution (LTE) network or a LTE Advanced network. In this case the BS may be denominated an enhanced NodeB (eNB).

According to an embodiment of the invention the first user equipment is served by the relay system with a first spatial radiation pattern and the second user equipment is served by the relay system with a second spatial radiation pattern being different from the first spatial radiation pattern. This may provide the advantage that a spatial differentiation between the two UEs can be realized for instance by applying an appropriate beamforming. Thereby, the overall data throughput within the radio telecommunication network may be increased.

It is mentioned that apart from employing different spatial radiation patterns for serving different UEs also different radio transmission resources with respect to a frequency spectrum and/or with respect to time slots can be allocated to different UEs. Thereby, a relay system self interference may be further reduced and available radio transmission resources may be exploited. This of course may lead to a further increase of the overall data throughput.

It is pointed out that for transmitting data via a radio link an appropriate radio transmission resource has to be provided. Typically, for the data transfer the overall available radio transmission resources are subdivided into a plurality of minimum of radio transmission resource units. This minimum unit may be called a physical resource block (PRB), a chunk and/or a slot. The minimum unit may be illustrated as a two-dimensional element within a coordinate system having a time-axis and a frequency-axis.

According to a further embodiment of the invention the larger performance is achieved by employing a full duplex transmission mode and the smaller performance is achieved by employing a half duplex transmission mode. This may provide the advantage that if relay system self interference effects can be overcome the RN can operate in full duplex transmission mode. As a consequence the data throughput between the relay system and the respective UE can be maximized.

According to a further embodiment of the invention the larger performance is achieved by employing a first modulation and coding scheme and the smaller performance is achieved by employing a second modulation and coding scheme. As has already been mentioned above, a sensitive modulation and coding scheme (MCS) that allows to carry a comparatively large amount of user data.

According to a further embodiment of the invention the relay system comprises exactly one relay node which serves both the first user equipment and the second user equipment.

In other words, both UEs are connected, scheduled and/or served by one and the same relay node (RN), which is connected to the (donor) BS.

It is pointed out that of course within the radio telecommunication system there may be provided further RNs, which however are not assigned to the relay system serving the first and the second UE. It is further pointed out that there may be one or more further UE(s) being served by the RN. Of course, also these UE(s) may be scheduled with an appropriate performance depending on the RN self interference which is caused by the respective UE.

According to a further embodiment of the invention the relay system comprises two relay nodes, wherein a first relay node serves the first user equipment and the second relay node serves the second user equipment.

In other words, the two UEs are connected, scheduled and/or served by different RNs, which however are connected to one and the same (donor) BS.

It is pointed out that of course within the radio telecommunication system there may be provided further RNs, which can be assigned to the relay system. However, there might also be one or more further RNs, which are connected to the (donor) BS and which are not assigned to the described relay system. It is further pointed out that there may be also one or more further UE(s) being served by any one of the mentioned RN(s).

According to a further embodiment of the invention the method further comprises (a) determining the first self interference caused by scheduling the first user equipment and (b) determining the second self interference caused by scheduling the second user equipment.

The described self interference determinations may involve appropriate radio measurements, which in principle can be carried out by any network element of the described radio telecommunication network. However, preferably the radio measurements are carried out by the relay system respectively the particular RN of the relay system.

The determinations of the self interferences respectively the self isolations may be carried out both for DL radio transmissions and for UL radio transmissions. Specifically, DL radio transmissions involve simultaneous radio transmissions (a) from the relay system respectively the particular RN to the relay connected UE(s) and (b) from the donor BS to the relay system. Correspondingly, UL radio transmissions involve simultaneous radio transmissions (a) from the relay connected UE(s) to the relay system respectively the particular RN and (b) from the relay system to the donor BS.

The results of the at least two self interference measurements performed by the relay system respectively the particular RN may be reported to the (donor) BS. Based on these measurements the (donor) BS may decide about an appropriate radio resource allocation for the first UE and for the second UE, which assign the first UE the above described first performance and the second UE the above described second performance.

Alternatively, the relay system may decide on its own about the allocation of appropriate radio resources to the first UE and to the second UE.

According to a further embodiment of the invention the method further comprises (a) determining a first backhaul-to-access interference representing the radio interference between (a1) the base station transmitting radio signals to the relay system and (a2) the first user equipment receiving radio signals from the relay system and (b) determining a second backhaul-to-access interference representing the radio interference between (b1) the base station transmitting radio signals to the relay system and (b2) the second user equipment receiving radio signals from the relay system. Thereby, the first performance and/or the second performance depend on the determined first backhaul-to-access interference and on the determined second backhaul-to-access interference.

The first performance and/or the second performance may be adjusted by allocating appropriate radio transmission resources to the respective UE.

It is pointed out that of course the strength of the respective interference has an impact on the respective performance. Accordingly, in order to be precise the strength of the first and the second backhaul-to-access interference is measured and the performances respectively the radio resource allocations depend on the strengths of the backhaul-to-access interferences.

Descriptive speaking, the UE(s) may suffer from radio transmissions from the (donor) BS to the relay system. This suffering is based on interference, which in this document is denominated backhaul-to-access interference.

The (strength of the) backhaul-to-access interference may be measured at the respective UE and reported to the relay system, which takes the measurement reports into account for performing an appropriate radio resource allocation. The backhaul-to-access interference may be measured by the UEs using neighboring cell measurements for instance based on the Received Signal Strength Indication (RSSI), the Reference Signal Received Power (RSRP) and/or the Reference Signal Received Quality (RSRQ).

Generally speaking, based on the different interference information which may be transmitted to the relay system, the relay system can divide the UEs within its area into two groups: a full duplex group and a half duplex group. Separating the UEs into such groups may permit the relay system respectively the particular RN to control and reduce the amount of interference generated. This furthermore, allows for the full duplex transmission mode to be exploited and thus increases the overall data throughput within the radio telecommunication network.

In this respect it is pointed out that the segmentation of the UEs to the full duplex group and to the half duplex group may be more or less regularly updated in order to account for updated measurement results. Thereby, changing radio transmission conditions within the radio telecommunication network may be taken into account.

According to a further embodiment of the invention the method further comprises (a) generating a radio transmission resource partitioning information based on measurement values representing (a1) the first self interference and the second self interference, and/or (a2) the first backhaul-to-access interference and the second backhaul-to-access interference, and (b) reporting the radio transmission resource partitioning information to the relay system. This may provide the advantage that the BS will be able to accomplish an effective radio resource partitioning between the various radio links extending between (b1) the BS and the relay system and (b2) the relay system and the two UEs.

Specifically, once the above mentioned interference measurements, in particular the two self interference measurements and the two backhaul-to-access interferences, are made, the relay system respectively the particular RN will generate a report and transmit it to the BS. This report may comprise the following information which is needed or which is at least useful for an appropriate and effective radio transmission resource partitioning:

(i) The amount of radio transmission resources needed by the relay system on the access link that can be shared with the backhaul link. Thereby, these radio transmission resources may be different for UL and DL radio transmissions. Therefore, it may be advantageous if the respective amount of radio transmission resources is reported separately for UL and DL.

(ii) The amount of radio transmission resources needed by the relay system on the access link that cannot be shared with the backhaul link because of self interference and/or because of backhaul-to-access interference. Again, it may be advantageous if the respective amount of radio transmission resources is reported separately for UL and DL.

According to a further embodiment of the invention the method further comprises (a) determining a first access-to-backhaul interference representing the radio interference between (a1) the first user equipment transmitting radio signals to the relay system and (a2) the base station receiving radio signals from the relay system and (b) determining a second access-to-backhaul interference representing the radio interference between (b1) the second user equipment transmitting radio signals to the relay system and (b2) the base station receiving radio signals from the relay system. Thereby, the first performance and/or the second performance depend on the determined first access-to-backhaul interference and on the determined second access-to-backhaul interference.

Descriptive speaking, the (donor) BS may suffer from radio transmissions which originate from the UE(s) and which are intended to be received by the relay system respectively the particular RN of the relay system. In this document this suffering is based on interference, which is denominated access-to-backhaul interference.

It is again pointed out that of course the strength of the respective access-to-backhaul interference has an impact on first performance and/or the second performance.

The access-to-backhaul interference, i.e. the uplink transmission on the access link from UEs interfere with the uplink transmission from the relay system on the backhaul link, may be measured directly at the BS. The BS may inform the relay system respectively the particular RN about the radio transmission resources, which have been used for backhauling and at which a too high level of interference from the access link has been measured. This information can be used by the relay system respectively by the particular RN to identify the UEs that have produced these access-to-backhaul interferences.

At this point it is mentioned that all or at least some of the above described measurements can be carried out periodically. Thereby, it can be taken into account that the strengths of the above described self interferences, the above described backhaul-to-access interferences and/or the above described access-to-backhaul interferences may vary over the time and can depend on the particular UE. Further, all or at least some of the above described measurements can be triggered by appropriate commands given by the relay system and/or the BS. This may allow for an effective consideration of potentially varying interference strengths.

According to a further embodiment of the invention the method further comprises (a) generating an improved radio transmission resource partitioning information based on measurement values representing (a1) the determined first self interference and the determined second self interference, (a2) the determined first backhaul-to-access interference and the determined second backhaul-to-access interference, and (a3) the determined first access-to-backhaul interference and the determined second access-to-backhaul interference, and (b) partitioning the available radio transmission resource in accordance with the generated improved radio transmission resource partitioning information. Thereby, the information about the two self interferences and the information about the two backhaul-to-access interference may be initially collected by the relay system and reported to the BS.

The information about the two access-to-backhaul interferences may be initially collected by the BS. At the BS all these information may be combined and the BS may decide which radio transmission resources the relay system respectively the particular RN can use for an access link extending between the RN and a UE and if that radio transmission resource(s) can also be used for the backhaul link extending between the relay system and the BS.

After having decided about which radio transmission resources can be used both for at least one of the access links and the backhaul link, the BS may communicate to the relay system two types of radio transmission resource information:

(i) Radio transmission resource information where the relay system has to schedule that UE that generates relevant self interference and/or suffers from backhaul-to-access interference and/or generates relevant access-to-backhaul interference. In order to avoid strong interference this radio transmission resource may be part of a half duplex transmission zone.

(ii) Radio transmission resource information where the relay system may schedule that UE that does not generate relevant self-interference and does not suffer from backhaul-to-access interference and does not generate relevant access-to-backhaul interference. This radio transmission resource may be part of a full duplex transmission zone.

For example, the radio transmission resource partitioning can be indicated by using the following simple three level bit-map:

"00": Resource not to be used by the relay system respectively the RN.

"01": Resource can be used (a) by relay system respectively the particular RN and (b) for scheduling UEs that generate relevant RN self interference and/or suffer from backhaul-to-access interference and/or generate relevant access-to-backhaul interference.

"10": Resource can be used (a) by the relay system respectively the particular RN and (b) for scheduling UEs that do not generate relevant RN self interference and do not suffer from backhaul-to-access interference and do not generate relevant access-to-backhaul interference.

According to a further embodiment of the invention the method further comprises configuring sub-frames as normal data sub-frames instead of MBSFN sub-frames, if the first and the second self interference and the first and the second backhaul-to-access interference are smaller than a predetermined work point of the relay system. This may provide the advantage that in case the mentioned interferences are comparatively small further radio transmission resources can be exploited for transferring user data. Thereby, the overall data throughput may be further increased.

In this respect it is noted that Multi-Media Broadcast over a Single Frequency Network (MBSFN) sub-frames are typically used only for downlink backhauling. If the self-interference and/or the backhaul-to-access interference become excessive, the relay system may have to re-assign normal data sub-frames to MBSFN sub frames. The major part of the MBSFN subframe can be blanked i.e. not contain any transmission and naturally during this part no self interference can be generated. This can be exploited to operate other links without self interference, e.g. operate the backhaul link without interference from the access link.

According to a further aspect of the invention there is provided a relay system for transferring data within a radio telecommunication network comprising a base station, the relay system, a first user equipment and a second user equipment. The relay system comprises (a) a first scheduling unit for scheduling the first user equipment with a first performance causing a first self interference of the relay system between (a1) a first access link extending between the relay system and the first user equipment and (a2) a relay link extending between the relay system and the base station, (b) a second scheduling unit for scheduling the second user equipment with a second performance causing a second self interference of the relay system between (b1) a second access link extending between the relay system and the second user equipment and (b2) the relay link extending between the relay system and the base station. Thereby, if the first self interference is larger than the second self interference the first performance is smaller than the second performance. Alternatively, if the first self interference is smaller than the second self interference the first performance is larger than the second performance.

The described relay system is based on the idea that different relay system self interferences, which are associated with the scheduling of different UEs, can be used for differentiating between the performances, which are assigned to the different UEs. As has already been elucidated above, if a scheduling of a UE causes only a small relay system self interference, this UE can scheduled with a large performance without affecting the operational reliability of the relay system. Correspondingly, if a scheduling of another UE causes a large relay system self interference, this other UE can only by scheduled with a comparatively small performance in order to guarantee that the operational reliability of the relay system is not negatively affected.

The described relay system may comprise one or more RNs. In case there is only one RN, this RN will serve both the first and the second UE. If there are at least two RN provided in the relay system, a first RN may serve the first UE and the second RN may serve the second UE. Thereby, all RNs are connected to one and the same (donor) BS.

According to a further aspect of the invention there is provided a base station for transferring data within a radio telecommunication network comprising the base station, a relay system, a first user equipment and a second user equipment. The provided base station comprises (a) a first scheduling unit for scheduling the first user equipment with a first performance causing a first self interference of the relay system between (a1) a first access link extending between the relay system and the first user equipment and (a2) a relay link extending between the relay system and the base station, and (b) a second scheduling unit for scheduling the second user equipment with a second performance causing a second self interference of the relay system between (b1) a second access link extending between the relay system and the second user equipment and (b2) the relay link extending between the relay system and the base station. Thereby, if the first self interference is larger than the second self interference the first performance is smaller than the second performance. Alternatively, if the first self interference is smaller than the second self interference the first performance is larger than the second performance.

Also the described base station is based on the idea that different relay system self interferences, which are associated with the scheduling of different UEs, can be used for differentiating between the performances, which are assigned to the different UEs.

The base station is connected with the relay system, which comprises one or more RNs. Therefore, the BS may also be called a donor BS.

According to a further aspect of the invention there is provided a computer-readable medium on which there is stored a computer program for transferring data within a radio telecommunication network comprising a base station, a relay system, a first user equipment and a second user equipment. The computer program, when being executed by a data processor, is adapted for controlling or for carrying out the data transferring method as described above.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

According to a further aspect of the invention there is provided a program element for transferring data within a radio telecommunication network comprising a base station, a relay system, a first user equipment and a second user equipment. The program element, when being executed by a data processor, is adapted for controlling or for carrying out the data transferring method as described above.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

The invention described in this document may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

It should be noted that there may be further aspects that may impact the achievable performance of the communication e.g. interference from outside the considered relay system, noise, the sensitivity of the different devices, the bandwidth assigned to different devices and further parameters. Then the finally achieved performance will depend on these aspects on top of the self interference described above. The invention also applies to such implementations that also consider such aspects on top of the self interference as is described here.

DETAILED DESCRIPTION

Figure 1:
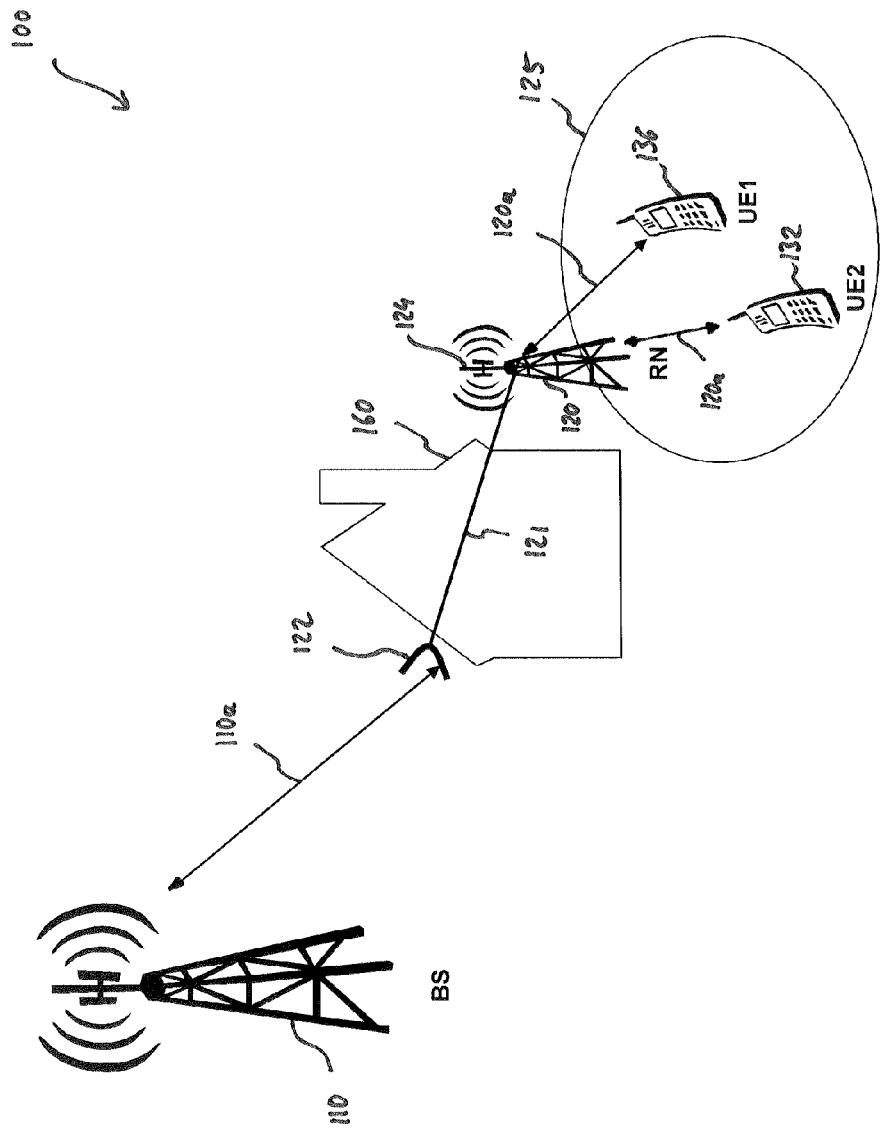
FIG. 1 shows a relay enhanced telecommunication network with two user equipments being served by a relay node, wherein scheduling the two user equipments causes different levels of relay node self interference.

The illustration in the drawing is schematically. It is noted that in different figures, similar or identical elements are provided with the same reference signs or with reference signs, which are different from the corresponding reference signs only within the first digit.

FIG. 1 shows a relay enhanced telecommunication network 100 operating in accordance with an embodiment of the present invention. The network 100 comprises a base station (BS) 110 and a relay node (RN) 120. The BS 110 and the RN 120 are connected via a radio link 110a, which is called a relay link or a backhaul link. The RN 120 serves a relay cell 125. The network 100 further comprises two user equipments, a first user equipment (UE) 136 and a second UE 132. The two UEs 136 and 132 are both connected to the RN 120 via radio links 120a. These radio links 120a are also called access links.

As can be seen from FIG. 1, the RN 120 is located close to an object, which represents a barrier for the propagation of radio signals. According to the embodiment described here this object is a house 160. For reducing impact of a radio wave attenuation by the house 160 the RN 120 comprises two antennas, a first antenna 122 and a second antenna 124. The first antenna 122 is mounted to the house 160 in such a manner, that its radiation pattern is preferably directed towards the BS 110. The RN is connected to the first antenna 122 via a radio frequency (RF) cable 121. With respect to the first antenna 122 the second antenna 124 is located at the other side of the house 160. As a consequence, there is at least a certain self isolation between the two antennas 122 and 124. This means that self interference effects, which arise when a radio signal being transmitted from one of the antennas 122, 124 is received by the other of the two antennas 124, 122, are small.

The antenna 124 comprises at least two antenna elements, which may be operated in such a manner that for serving the relay cell 125 beamforming can be utilized. In the transmitting case beamforming can be realized for instance by applying certain phase shifts between the radio signals which are fed to the two antenna elements. In the receiving case the signals received by the two antenna elements are combined with applying certain phase shifts. Since the principles of beamforming are well known by persons skilled in the art, for the sake of conciseness no further technical details about beamforming will be given in this document.

According to the embodiment described here an appropriate beamforming is applied such that the first UE 136 is served with a first spatial radiation pattern and the second UE 132 is served with a second radiation pattern being different from the first radiation pattern. Thereby, in the described radio scenario transmitting a radio signal from the RN 120 to the first UE 136 causes a smaller self interference of the RN 120 than transmitting a radio signal from the RN 120 to the second UE 132. As a consequence, the first UE 136 can be scheduled by the RN 120 with a first performance and the second UE 132 can be scheduled by the RN 120 with a second performance being smaller than the first performance.

According to the embodiment described here the RN 120 has the capability to receive and to transmit radio signals simultaneously in the same frequency band. Due to the above described self isolation this capability can be exploited for scheduling the first UE 136 with the first performance. It is mentioned that the self isolation of the RN 120 can be increased by an advanced signal processing and/or by advanced antennas 122 and 124.

The RN self isolation can be measured by the RN itself by performing TX and RX simultaneously. Based on the results of these measurements, which according to the embodiment described here are different when scheduling different UEs 136, 132, the RN 120 can decide to schedule the first UE 136 with a full duplex radio transmission mode and the second UE with a half duplex radio transmission mode. This status can be reported to the BS 110, which can properly adjust the time sub-frames being used for backhauling. Specifically, the BS may not use a time sub-frame for backhauling when the second UE 132 is scheduled. Equivalently, the RN may schedule UE 132 when the BS does not use a time sub-frame for backhauling.

In the described operational mode based on different RN self interference strengths the two UEs are classified into two different groups which are scheduled with different duplex radio transmission modes. This may provide the advantage that the overall data throughput of the telecommunication network 100 can be optimized without deteriorating the reliability of the data transfers. This is achieved by employing the full duplex operation only for those UEs, which when being scheduled do only cause a minor or even no RN self interference.

Figure 2:
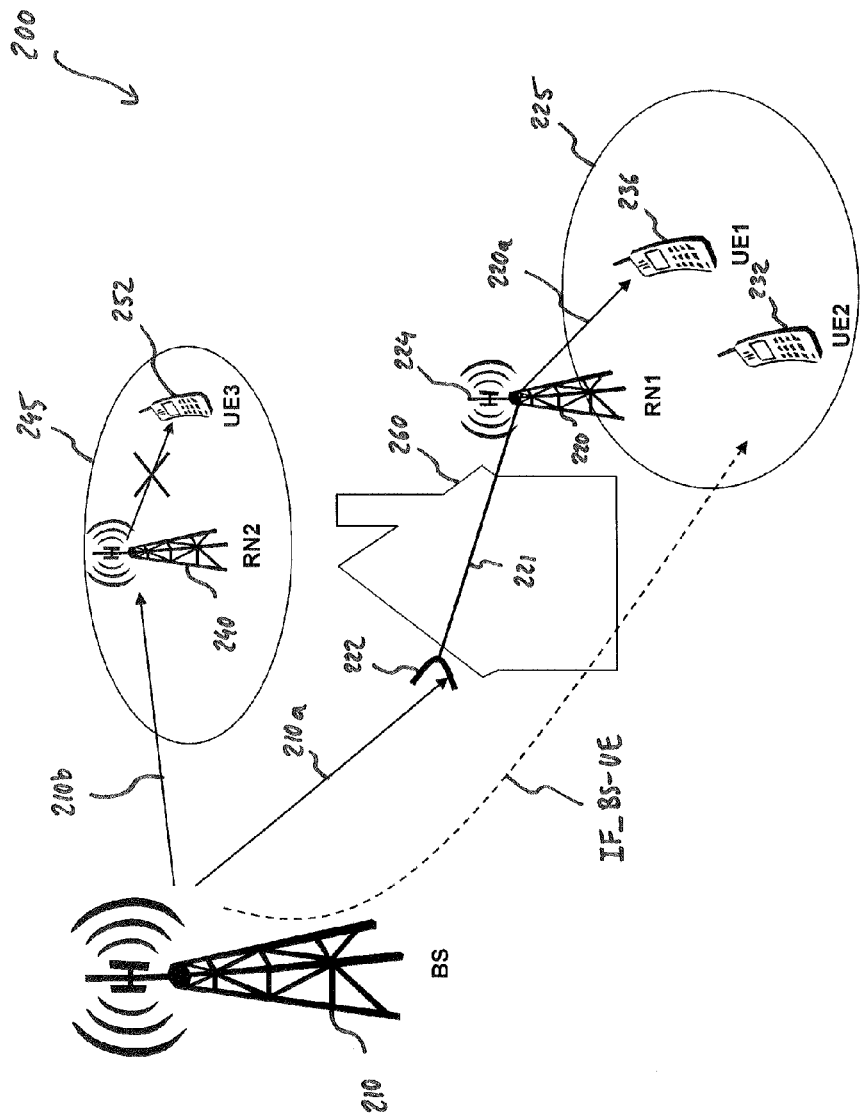
FIG. 2 shows a relay enhanced telecommunication network with two relay nodes being connected to the one base station and with three user equipments, wherein two user equipments are served by one relay node and one user equipment is served by the other relay node.

FIG. 2 shows a relay enhanced telecommunication network 200, which compared to the network 100 shown in FIG. 1 additionally comprises a second RN 240 serving a third UE 252 which is located in a second relay cell 245. The other elements of the network 200, i.e. the BS 210, the first RN 220 comprising the antennas 222 and 224 being connected via the RF cable 221, the relay cell 225, the two UEs 236 and 232 and the house 260 are the same as the corresponding elements of the network 100, which have been denominated with corresponding reference numbers having a first digit "1".

In the operational state shown in FIG. 2, which state represents a particular time sub-frame, the two RNs 220 and 240 and the first UE 236 are involved in DL radio transmissions. Therefore, the first RN 220 is connected to the BS 210 via a DL relay link 210*a*. Correspondingly, the second RN 240 is connected to the BS 210 via a DL relay link 210*b*. Further, the first UE 236 is connected to the RN 220 via a DL access link 220*a*.

According to the embodiment described here the second UE 232 suffers from radio interference, which originates from the BS 210. In FIG. 2 this interference is illustrated with a dashed line being identified with the reference sign IF_BS-UE.

To avoid the possible interference IF_BS-UE between the BS 210 to the UE 232 connected to the RN 220 during a sub-frame being used for radio transmissions from the BS 210 to the RN 220, the RN can request the UEs 232 and 236 to measure the signal strength received from the BS 210. Then the UEs 232, 236 are divided into two groups: (A) A first group of UE(s) which are not or only little interfered by the BS and (B) a second group of UE(s) which are interfered by the BS.

According to the embodiment described here the first UE 236 is not interfered by the BS 210 and the second UE 232 is interfered by the BS 210. As a consequence, during a radio transmission from the BS 210 to the two RNs 220 and 240, the first UE 236 can be scheduled. Because of the interference IF_BS-UE the second UE 232 cannot be scheduled. In this respect it is mentioned that when scheduling the first UE 236 during BS-to-RN radio transmissions it is of course also necessary, that the RN 220 does not suffer from RN self interference as described above.

Such a RN self interference is the reason that according to the operational state shown in FIG. 2 the second RN 240 cannot schedule its connected UE, i.e. the third 252, during a sub-frame which is used for transmitting DL radio signals from the BS 210 to the RN 240 via the backhaul link 210*b*.

In this respect it is pointed out that of course a scheduling of the third UE 252 would also not be possible during an interference generated by the BS 210 and acting on the RN 240. This means that the third UE 252 can only be scheduled with a full duplex transmission mode during sub-frames in which there is neither strong RN self interference nor strong BS-to-UE interference.

Figure 3:
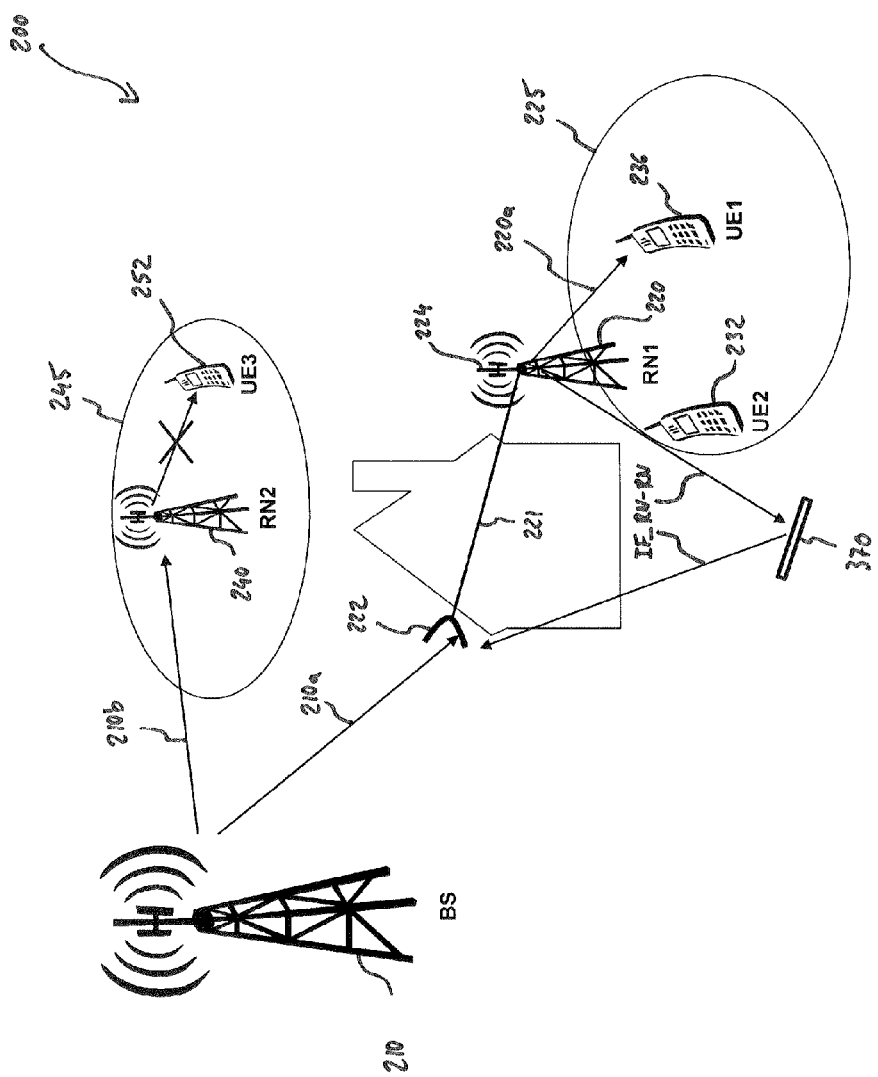
FIG. 3 shows the relay enhanced telecommunication network as shown in FIG. 2, wherein a radio reflector is affecting the self interference of the relay node serving two user equipments.

FIG. 3 shows the relay enhanced telecommunication network as shown in FIG. 2, wherein a radio reflector 370 is affecting the self interference IF_RN-RN of the RN 220 serving the first UE 236 and the second UE 232. The reflector caused self interference IF_RN-RN at the RN 220 may be strong in particular if the RN self isolation is only achieved with directional antennas 222 and 224, without using a long RF cable 221.

According to the embodiment described here the RN self isolation depends on which UE is served by the RN 220. This dependency is in particular strong if the RN has multiple antennas and uses beamforming. If the RN 220 knows (sufficiently in advance), when it is scheduled on which Physical Resource Blocks (PRBs) on the relay link 210*a*, it can avoid such self-interference on the crucial PRBs.

For DL transmissions the RN 220 and the UE(s) 236, 232 can negotiate when or where the RN 220 is allowed to self interfere and when or where it is not allowed. This can be done in time and/or in frequency and/or in spatial domain. In the described embodiment, when the RN 220 schedules the second UE 232, it will generate a large RN self interference which causes that the same PRB cannot be used for receiving signals from the BS 210. By contrast thereto, the first UE, which can be scheduled without causing RN self interference, can be scheduled on the same PRBs, which may also be used for radio transmissions between the BS 210 and the RN 220. Generally speaking, when due to an appropriate scheduling of the RN 220 by the BS 210 the RN 220 is allowed to interfere with itself, the RN schedules the second UE 232. When due to an appropriate scheduling of the RN 220 by the BS 210 the RN 220 is not allowed to interfere with itself, the RN schedules the first UE 236.

Further, the BS 210 might inform the RN 220 which PRBs must not be used for transmitting radio signals from the RN 220 to the BS 210. These PRBs can be used for scheduling the second UE 232. In particular, these PRBs can be used by the second UE 232 for transmitting radio signals to the RN 220.

Furthermore, when the RN generates a strong self interference the reliability for correct radio data transfer can be increased if the BS 210 transmits its radio signals with an enhanced transmitting power and/or if the BS 210 uses a more robust modulation and coding scheme (MCS). However this will come at the expense of reduced performance because more robust MCS can only carry less data and, in case of increased power, this power is not available for other transmissions.

For UL transmissions to the BS 210 the RN 220 may only be scheduled on some PRBs, wherein it is taken into account that the sensitivity of the RN 220 on the UE-to-RN link may be compromised there when scheduling its UEs. Again, this disadvantage can be mitigated for instance by using a larger radio transmitting power, a lower MCS and/or other PRBs.

Figure 4A:
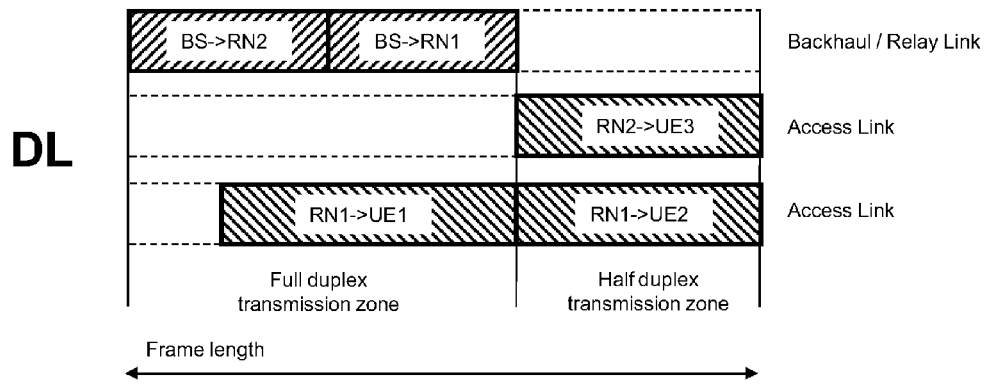
FIGS. 4a and 4b show uplink and downlink frame structures for the relay enhanced telecommunication network shown in FIG. 3, wherein depending on a user equipment dependent relay node self interference one relay node at least temporarily supports a full duplex radio transmission and the other relay node supports only half duplex radio transmission.
Figure 4B:
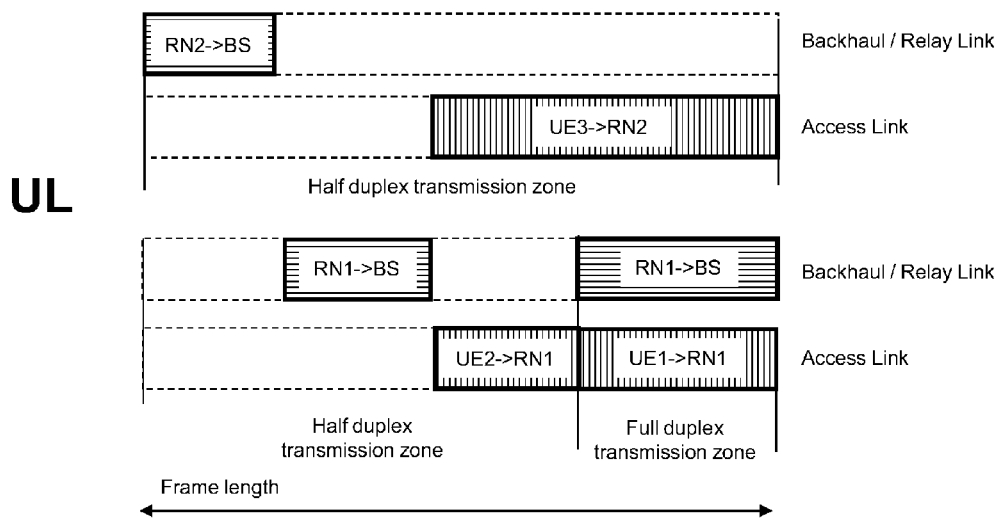

FIGS. 4a and 4b show uplink and downlink frame structures for the relay enhanced telecommunication network 200 shown in FIG. 3. As has already been elucidated above, depending on a UE dependent RN self interference the first RN 220 at least temporarily supports a full duplex radio transmission and the second RN 240 only supports half duplex radio transmission. Specifically, according to the operational state of the network 200 shown in FIG. 3 the first RN 236 has good self isolation and can support full duplex transmission. The first UE 236 can support full duplex transmission, the second UE 232 cannot support full duplex transmission due to the radio interference originating from the BS 210 and/or the large RN self-interference caused by the reflector 370. Due to the large RN self interference of the second RN 240, the second RN 240 cannot support full duplex transmission at all. Therefore, the third UE cannot benefit from a full duplex transmission.

As can be seen from FIG. 4a, which shows a suitable frame structure for DL radio transmissions on a time axis, a frame length is divided in a full duplex transmission zone and in a half duplex transmission zone. In the full duplex transmission zone both the second RN 240 and the first RN 220 can be scheduled by the BS 210 using full duplex transmission. Further, due to (a) the small interference from the BS 210 to the first UE 236 and due to (b) the small self interference of the first RN 220 also the first UE 236 can be scheduled by the RN 220.

By contrast thereto, due to (a) the large interference from the BS 210 to the second UE 232 and possibly also to the third UE 252 and/or due to (b) large self interferences of the first RN 220 and the second RN 240, the second UE 232 and the third UE 252 must not be scheduled during the full duplex transmission zone. The second UE 232 and the third UE 252 are only scheduled during the half duplex transmission zone by employing half duplex transmission.

As can be seen from FIG. 4b, which shows a suitable frame structure for UL radio transmissions within the network 200, the second RN 240 can only use half duplex transmission. This holds both for radio transmissions on the backhaul or relay link from the second RN 240 to the BS 210 and for radio transmissions on the access link from the third UE 252 to the second RN 240.

By contrast thereto, the first RN 220 can temporarily benefit from a full duplex transmission. Specifically, during a full duplex transmission zone (a) the first RN 220 can transmit to the BS 210 and the first UE 236 can transmit to the first RN 220. Further, during a half duplex transmission zone (a) the first RN 220 can transmit to the BS 210 and the second UE 232 can transmit to the first RN 220.

FIGS. 5a to 5d illustrate a possible signaling procedure for allowing a full duplex transmission in a relay enhanced telecommunication network 500, which comprises at least a BS 510, a RN 520 and a UE 536. The RN 520 is connected to the BS 510 via a DL backhaul link 510a and an UL backhaul link 510b. The UE 536 is connected to the RN 520 via a DL access link 520a and an UL access link 520b. As has already been elucidated above, there is at least some radio interference from the BS 510 to the UE 536 (denominated IF_BS-UE) and some radio interference from the UE 536 to the BS 510 (denominated IF_UE-BS). Further, there is at least some RN self interference during uplink (denominated IFUL_RN-RN) and some RN self interference during downlink (denominated IFDL_RN-RN).

Figure 5A:
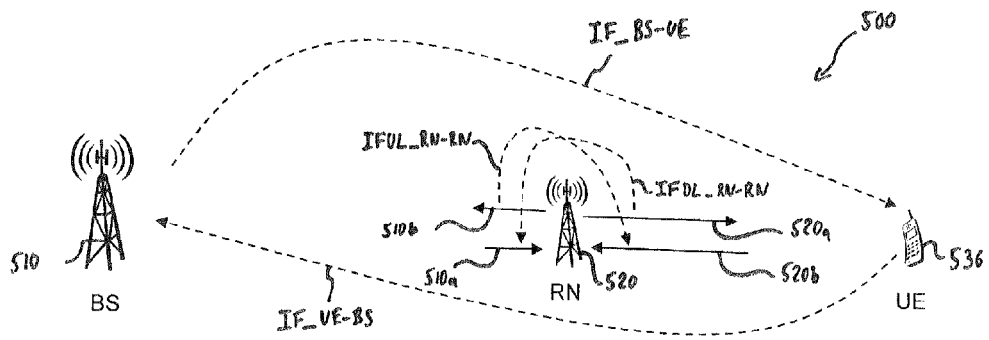
FIGS. 5a to 5d illustrate a signaling procedure for allowing full duplex transmission in a relay enhanced telecommunication network.

In a first step shown in FIG. 5a the BS 510 measures the interference IF_UE-BS originating from the UE 536. Further, the RN 520 measures its self interference, particularly the RN self interference IFUL_RN-RN during uplink and the RN self interference IFDL_RN-RN during downlink. Furthermore, the UE 536 measures the interference IF_BS-UE originating from the BS 510.

Figure 5B:
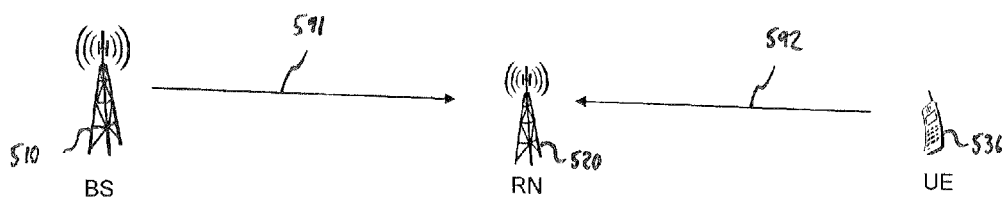

In a second step shown in FIG. 5b the BS 510 informs the RN 520 with an interference information 591 about the strength of the interference IF_UE-BS. Further, the UE 536 informs the RN 520 with an interference information 592 about the strength of the interference IF_BS-UE. Thereafter, the RN 520 determines the PRBs used for the access link 520a, 520b, which PRBs can be shared with the backhaul link 510a, 510b. Further, the RN 520 determines the PRBs used for the access link 520a, 520b, which PRBs cannot be shared with the backhaul link 510a, 510b. Thereby, the strengths of the interferences IF_UE-BS, IFUL_RN-RN, IFDL_RN-RN and IF_BS-UE are taken into account. Further, an UL and a DL buffer status on the access side may be taken into account.

Figure 5C:
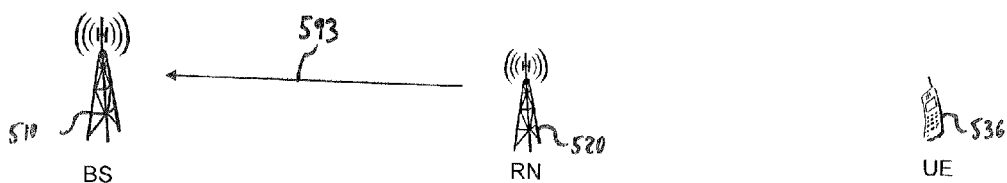

In a third step shown in FIG. 5c the RN 520 transmits a report message 593 to the BS 510. This report message 593 indicates which or at least how many "access PRBs" can be shared with backhaul transmissions and which "access PRBs" cannot be shared with backhaul transmissions. Based on this information about "shareable PRBs" the BS 510 calculates an appropriate segmentation of the frame length into the full duplex transmission zones and the half duplex transmission zones.

Figure 5D:
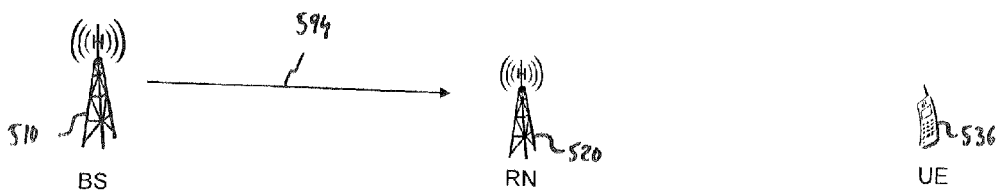

In a fourth step shown in FIG. 5d a corresponding duplex transmission zone indication message 594 is transmitted from the BS 510 to the RN 520. Therewith, the RN 520 can apply an appropriate scheduling of the UE(s) and the BS which allows for an improved overall data throughput.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 relay enhanced telecommunication network
110 base station (BS)
110a relay link
120 relay node (RN)
120a access link
121 RF cable
122 first antenna
124 second antenna
125 relay cell
132 user equipment 136 user equipment
160 radio barrier/house
200 relay enhanced telecommunication network
210 base station
210a DL relay link
210b DL relay link
220 first relay node
220a DL access link
221 RF cable
222 first antenna
224 second antenna
225 first relay cell
232 user equipment
236 user equipment
240 second relay node
245 relay cell
252 user equipment
260 radio barrier/house
IF_BS-UE interference BS-to-UE
370 reflector
IF_RN-RN RN self interference
500 relay enhanced telecommunication network
510 base station (BS)
510a DL relay link/DL backhaul link
510b UL relay link/UL backhaul link
520 relay node (RN)
520a DL access link
520b UL access link
536 user equipment
591 interference (UE-to-BS) information
592 interference (BS-to-UE) information
593 report message
594 duplex transmission zone indication message
IFUL_RN-RN RN self interference during uplink
IFDL_RN-RN RN self interference during uplink
IF_BS-UE interference BS-to-UE
IF_UE-BS interference UE-to-BS

The invention claimed is:

1. A method comprising:
scheduling a first user equipment with a first performance causing a first self interference of a relay system between a first access link extending between the relay system and the first user equipment and a relay link extending between the relay system and a base station,
scheduling a second user equipment with a second performance causing a second self interference of the relay system between a second access link extending between the relay system and the second user equipment and the relay link extending between the relay system and the base station,
determining the first self interference caused by scheduling the first user equipment, and
determining the second self interference caused by scheduling the second user equipment, wherein:
(a) when the first self interference is larger than the second self interference, the first performance is smaller than the second performance, and
(b) when the first self interference is smaller than the second self interference, the first performance is larger than the second performance, and
wherein, based on the determined first and second self interference, the first and second user equipments are classified into two different groups which are scheduled with different duplex radio transmission modes, this classification being reported to the base station, and
wherein said method is for transferring data within a radio telecommunication network comprising the base station, the relay system, the first user equipment and the second user equipment.

2. The method as set forth in claim 1, wherein the first user equipment is served by the relay system with a first spatial radiation pattern and the second user equipment is served by the relay system with a second spatial radiation pattern different from the first spatial radiation pattern, wherein first and the second radiation patterns cause different self interferences at the relay system.

3. The method as set forth in claim 1, wherein the larger performance is achieved by employing a full duplex transmission mode, and the smaller performance is achieved by employing a half duplex transmission mode.

4. The method as set forth in claim 1, wherein the larger performance is achieved by employing a first modulation and coding scheme, and the smaller performance is achieved by employing a second modulation and coding scheme.

5. The method as set forth in claim 1, wherein the relay system comprises exactly one relay node which serves both the first user equipment and the second user equipment.

6. The method as set forth in claim 1, wherein the relay system comprises two relay nodes, wherein a first relay node serves the first user equipment and a second relay node serves the second user equipment.

7. The method as set forth in claim 1, further comprising:
determining a first backhaul-to-access interference representing the radio interference between: (a) the base station transmitting radio signals to the relay system, and (b) the first user equipment receiving radio signals from the relay system, and
determining a second backhaul-to-access interference representing the radio interference between: (a) the base station transmitting radio signals to the relay system, and (b) the second user equipment receiving radio signals from the relay system, wherein the first performance and/or the second performance depend on the determined first backhaul-to-access interference and on the determined second backhaul-to-access interference.

8. The method as set forth in claim 1, further comprising:
generating a radio transmission resource partitioning information based on measurement values representing: (a) the first self interference and the second self interference, and/or (b) the first backhaul-to-access interference and the second backhaul-to-access interference, and
reporting the radio transmission resource partitioning information to the relay system.

9. The method as set forth in claim 1, further comprising;
determining a first access-to-backhaul interference representing the radio interference between: (a) the first user equipment transmitting radio signals to the relay system, and (b) the base station receiving radio signals from the relay system, and
determining a second access-to-backhaul interference representing the radio interference between: (a) the second user equipment transmitting radio signals to the relay system, and (b) the base station receiving radio signals from the relay system,
wherein the first performance and/or the second performance depend on the determined first access-to-backhaul interference and on the determined second access-to-backhaul interference.

10. The method as set forth in claim 9, further comprising:
generating an improved radio transmission resource partitioning information based on measurement values representing:

(a) the determined first self interference and the determined second self interference,
(b) a determined first backhaul-to-access interference and the determined second backhaul-to-access interference, and
(c) the determined first access-to-backhaul interference and the determined second access-to-backhaul interference, and partitioning the available radio transmission resource in accordance with the generated improved radio transmission resource partitioning information.

11. The method as set forth in claim 1, further comprising:
configuring sub-frames as normal data sub-frames instead of multi-media broadcast over a single frequency network sub-frames, when the first and the second self interference and a first and a second backhaul-to-access interference are smaller than a predetermined work point of the relay system.

12. An apparatus comprising:
at least one processor; and
at least one memory including computer program code, the at least one memory and the computer program code configured, with the at least one processor, to cause the apparatus to perform the following:
scheduling a first user equipment with a first performance causing a first self interference of a relay system between a first access link extending between the relay system and the first user equipment and a relay link extending between the relay system and a base station, and
scheduling a second user equipment with a second performance causing a second self interference of the relay system between a second access link extending between the relay system and the second user equipment and the relay link extending between the relay system and the base station,
determining the first self interference caused by scheduling the first user equipment, and
determining the second self interference caused by scheduling the second user equipment, wherein:
(a) when the first self interference is larger than the second self interference, the first performance is smaller than the second performance, and
(b) when the first self interference is smaller than the second self interference, the first performance is larger than the second performance, and
wherein, based on the determined first and second self interference, the first and second user equipments are classified into two different groups which are scheduled with different duplex radio transmission modes, this classification being reported to the base station, and
wherein said apparatus is one of a relay node or the base station, said relay node or said base station being for transferring data within a radio telecommunication network comprising said base station, said relay system having at least said relay node, said first user equipment and said second user equipment.

13. The apparatus as set forth in claim 12, wherein the first user equipment is served by the apparatus with a first spatial radiation pattern and the second user equipment is served by the apparatus with a second spatial radiation pattern different from the first spatial radiation pattern, and wherein first and the second radiation patterns cause different self interferences at the relay system.

14. The apparatus method as set forth in claim 12, wherein the at least one memory and the computer program code are further configured, with the at least one processor, to cause the apparatus to perform the following:
determining a first backhaul-to-access interference representing the radio interference between: (a) the base station transmitting radio signals to the relay system, and (b) the first user equipment receiving radio signals from the relay system, and
determining a second backhaul-to-access interference representing the radio interference between: (a) the base station transmitting radio signals to the relay system, and (b) the second user equipment receiving radio signals from the relay system, wherein the first performance and/or the second performance depend on the determined first backhaul-to-access interference and on the determined second backhaul-to-access interference.

15. The apparatus as set forth in claim 12, wherein the at least one memory and the computer program code are further configured, with the at least one processor, to cause the apparatus to perform the following:
generating a radio transmission resource partitioning information based on measurement values representing: (a) the first self interference and the second self interference, and/or (b) the first backhaul-to-access interference and the second backhaul-to-access interference, and
reporting the radio transmission resource partitioning information to the relay system.

16. The apparatus as set forth in claim 12, wherein the at least one memory and the computer program code are further configured, with the at least one processor, to cause the apparatus to perform the following:
determining a first access-to-backhaul interference representing the radio interference between: (a) the first user equipment transmitting radio signals to the relay system, and (b) the base station receiving radio signals from the relay system, and
determining a second access-to-backhaul interference representing the radio interference between: (a) the second user equipment transmitting radio signals to the relay system, and (b) the base station receiving radio signals from the relay system,
wherein the first performance and/or the second performance depend on the determined first access-to-backhaul interference and on the determined second access-to-backhaul interference.

17. The apparatus as set forth in claim 16, wherein the at least one memory and the computer program code are further configured, with the at least one processor, to cause the apparatus to perform the following:
generating an improved radio transmission resource partitioning information based on measurement values representing:
(a) the determined first self interference and the determined second self interference,
(b) a determined first backhaul-to-access interference and a determined second backhaul-to-access interference, and
(c) the determined first access-to-backhaul interference and the determined second access-to-backhaul interference, and
partitioning the available radio transmission resource in accordance with the generated improved radio transmission resource partitioning information.

18. The apparatus as set forth in claim 12, wherein the at least one memory and the computer program code are further configured, with the at least one processor, to cause the apparatus to perform the following:

configuring sub-frames as normal data sub-frames instead of multi-media broadcast over a single frequency network sub-frames, when the first and the second self interference and a first and a second backhaul-to-access interference are smaller than a predetermined work point of the relay system.

19. A computer program product comprising a non-transitory computer-readable storage medium bearing computer program code embodied therein for use with a computer, the computer program code comprising code for performing at least the following:

scheduling a first user equipment with a first performance causing a first self interference of a relay system between a first access link extending between the relay system and the first user equipment and a relay link extending between the relay system and a base station, scheduling a second user equipment with a second performance causing a second self interference of the relay system between a second access link extending between the relay system and the second user equipment and the relay link extending between the relay system and the base station, determining the first self interference caused by scheduling the first user equipment, and determining the second self interference caused by scheduling the second user equipment, wherein:

(a) when the first self interference is larger than the second self interference, the first performance is smaller than the second performance, and (b) when the first self interference is smaller than the second self interference, the first performance is larger than the second performance, and wherein, based on the determined first and second self interference, the first and second user equipments are classified into two different groups which are scheduled with different duplex radio transmission modes, this classification being reported to the base station.

* * * * *